H. T. SHRIVER.
ELECTROLYTIC CELL.
APPLICATION FILED APR. 3, 1915.

1,181,549.

Patented May 2, 1916.
2 SHEETS—SHEET 1.

Witnesses:-
Titus H Irons
Louise M. Bruns

Inventor:-
Harry T. Shriver
by his Attorney
George F. Scull

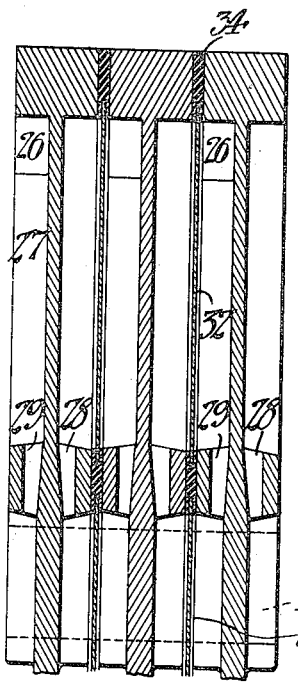

ved certain new and useful Improve-
UNITED STATES PATENT OFFICE.

HARRY T. SHRIVER, OF WEST ORANGE, NEW JERSEY.

ELECTROLYTIC CELL.

1,181,549. Specification of Letters Patent. Patented May 2, 1916.

Application filed April 3, 1915. Serial No. 18,870.

*To all whom it may concern:*

Be it known that I, HARRY T. SHRIVER, a citizen of the United States, residing at Llewellyn Park, West Orange, in the county of Essex, State of New Jersey, have invented certain new and useful Improvements in Electrolytic Cells; and I do declare the following to be a full, true, and exact description of the said invention, such as will enable others skilled in the art to which it appertains to make use of the same.

This invention relates to electrolytic cells such as are particularly suitable for decomposing liquids, generally water, into their constituent gases.

One of the objects of the invention is to produce an electrolytic cell which is simple in construction and economical to operate.

Another object of the invention is to provide in a "filter type" form of electrolytic cell a non-leaking diaphragm.

Another object of the invention is to provide an electrode arranged so that the gases formed thereon can be readily passed away with a minimum disturbance of the electrolyte.

With these and other objects in view, my invention consists of certain novel features of combination, construction and arrangement of parts as will be more fully described and pointed out in the appended claims.

Figure 2:
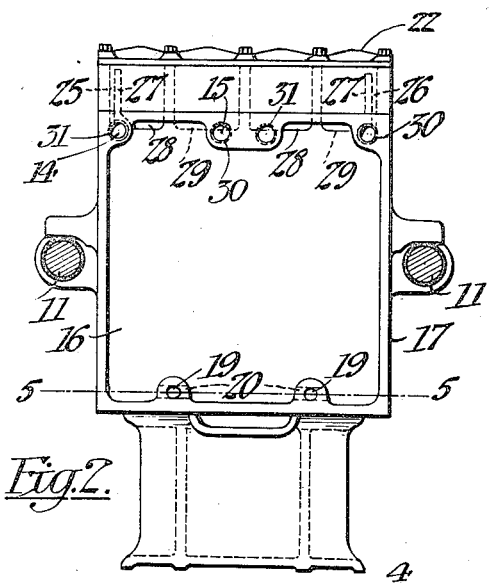
Figure 1:
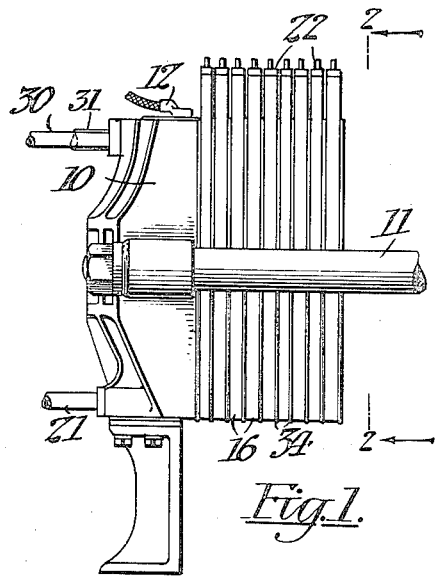
Figure 3:
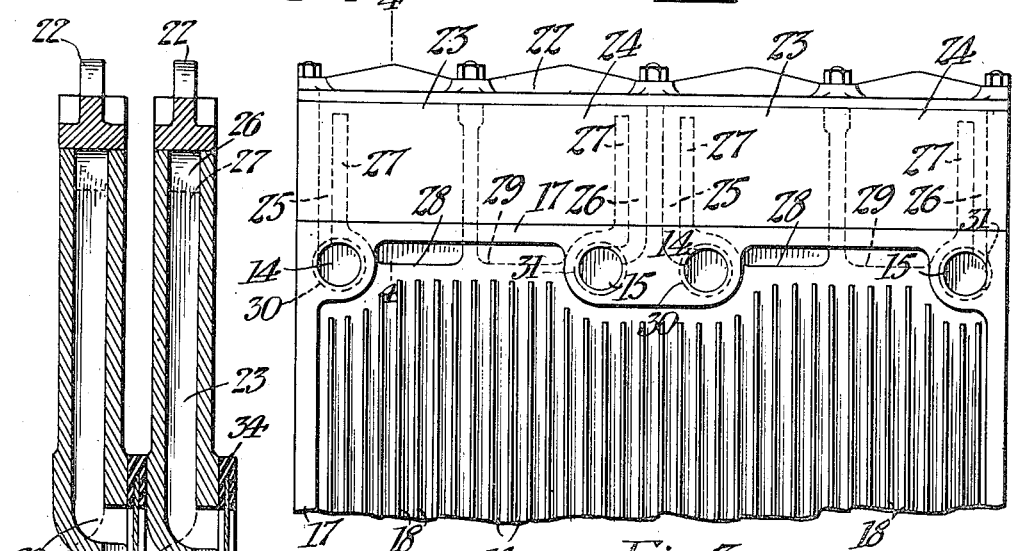
Figure 4:
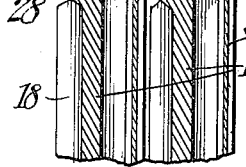
Figure 5:
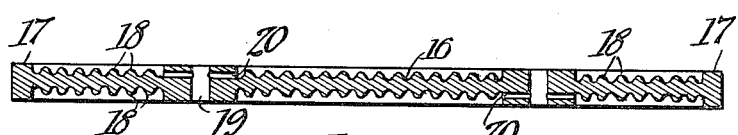

In the drawings, Figure 1 is a side elevation of a portion of a filter press type electrolyzer of well known construction, in which is shown one form of my novel electrode. Fig. 2 is an end view of Fig. 1, looking from the direction of the arrows 2—2. Fig. 3 is an enlarged elevation of a portion of one form of my novel electrode. Fig. 4 is a section on the line 4—4 of Fig. 3 much enlarged, and showing a number of assembled plates. Fig. 5 is a section on the line 5—5 of Fig. 1 much enlarged. Fig. 6 is an elevation of a portion of another form of my novel electrode and Fig. 7 is a section on the line 7—7 of Fig. 6 much enlarged showing a number of the plates of Fig. 6 assembled. Fig. 8 is still another form of my novel electrode plate and Fig. 9 is a section on the line 9—9 of Fig. 8 showing a number of the plates of Fig. 8 assembled. Fig. 10 is an enlarged section of a portion of a novel form of diaphragm.

The corresponding parts are referred to both in the drawings and in the specification by similar reference characters.

Referring now to Figs. 1 and 2, only so much of the electrolyzer is illustrated as is necessary to clearly understand my present invention. In the filter press type of electrolyzer, which I have chosen for purposes of illustration, a series of electrodes in the form of flat plates, recessed on either side and separated from each other by diaphragms, are held together by means of the pressure between two heads 10 (only one being shown in Fig. 1) which heads are drawn together by means of the rods 11. This pressure serves to bind the gaskets between the successive plates so that the electrolyte which fills the recesses in the plates cannot leak out. Current is passed through these successive plates in series from any suitable source of electricity, one of the terminals being shown at 12. Ordinarily, in the formation of hydrogen and oxygen, for which these electrolyzers are generally used, a solution of caustic potash, or caustic soda, forms the electrolyte. Between each plate is held a diaphragm which is sufficiently porous to permit the electrolyte to permeate it, and at the same time sufficiently closely woven to prevent the gases formed in the cell from mixing. When the current is turned on, one kind of gas will form on one face of each plate and another on the opposite face, but by reason of the presence of the diaphragm between them, these gases cannot mix and will rise to the top of each plate or cell to be there carried off. So much of the invention as I have so far described is well known.

As a means for conducting away the gases formed, the electrode plates as heretofore made, have contained a number of ducts or tubes as at 14, 15, these tubes extending through each plate and forming, when the plates are assembled as in Fig. 1, a continuous conduit by which the gases are led to any suitable receiver. Heretofore, these ducts 14, 15 have opened directly into the recessed portions of the plates, so that they were necessarily filled with the electrolyte. This column of fluid then formed a ready path for the current to pass through without decomposing any gases, and thereby materially reducing the efficiency of the machine. One of the features of my present invention is to arrange these ducts in such a manner that they will no longer be filled with electrolyte and there will therefore not be the corresponding waste of electricity. I may accomplish this result in a number of ways, but generally speaking, I arrange the ducts in such a manner that they, together with the ports or openings leading from each cell to the duct, will be arranged to prevent the electrolyte flowing from the cell to the duct.

Figs. 3, 4 and 5 illustrate one form of plate electrode which I have chosen for purposes of illustration, and which accomplishes my novel result. This plate I have designated generally as 16, and it is provided along its edges with a narrow finished strip 17 extending entirely around it, and also around the openings 14, 15 which are the outlets for the gases. The plate 16 is provided with ribs 18 in the usual manner, and also with inlet ducts 19 by which the electrolyte is supplied to each side of the cells formed when the plates are placed face to face, the duct 19 communicating through 20 with the cells. It will be understood that the water consumed by the generation of gases is supplied to the duct 19 through a pipe at the exterior as at 21.

In the form of plate shown in Figs. 3 and 4, I extend the plate above the finished portion 17 to form a number of gas chambers which are closed at the top by a cover plate 22. These gas chambers I have designated by 23—23 and 24—24. Each of these gas chambers connects through a passage, as at 25 or 26, with one of the ducts 14, 15 this passage being formed by a barrier 27 in the gas chamber. Openings 28—28 lead from one face of the plate to the chambers 23—23 and another set of openings 29—29 lead to the chambers 24—24. With this construction it will be understood that the gases arising along one surface of the plate, being for instance, hydrogen, pass through the openings 28—28 into the chambers 23—23 and from thence by means of the passages 25 into the ducts 14—14 from which the gas is led, by means of the pipes 30—30, to a suitable receiver. Likewise the gases formed on the opposite sides of the plate, as for instance, oxygen, will rise through the openings 29—29 into the chambers 24—24 passing from thence by the passages 26—26 to the ducts 15—15 from which the gas is led by the pipes 31—31 to a suitable receiver.

It will be understood that the plates are separated by a suitable diaphragm, such as described above, and are prevented from leaking by means of a gasket, all in the usual manner, the gasket extending around the finished strips or surfaces 17—17 of the plates and the diaphragm extending across the recesses formed in the surfaces of the plate.

In order to obtain the greatest efficiency of the machine, the electrolyte should entirely fill the recessed portion. In other words, the machine should be filled with electrolyte until its level is at least up to the lower line of the surface 17 at the top of the plate. It will be seen from this that if the cell opened directly into the ducts 14, 15, these latter would be filled with electrolye, thus forming a short path for the electric current as pointed out above. By my novel construction, the level of the electrolyte may be even above the finished portion 17 at the top of the plate, and still the ducts 14, 15 will be free therefrom. In fact, it will be obvious that until the electrolyte rises to the top of the barriers 27 none of it will flow through the ducts 14—15. These gas chambers 23, 24 serve as "risers" by means of which it can be assured that the level of the electrolyte will be at least up to its highest level for efficiency, and at the same time insure freedom of the ducts 14, 15 from the electrolyte.

It will be noted from the construction of Fig. 3 that the gases arising along the surfaces of the plate 16 will be obliged to move sidewise unless they happen to rise directly in the openings 28, 29. For some purposes it is desirable that the gases be given direct egress from the cell and the forms of my novel plate, which I have illustrated in Figs. 6 and 7, and in Figs. 8 and 9, are designed to this end. The form shown in Figs. 6 and 7, have in general the same construction, so far as gas chambers and ducts are concerned, as heretofore explained as to the form shown in Figs. 3 and 4. In Figs. 6 and 7, however, the gas chambers are formed by recesses on either side of the plate above the active electrolytic portion, these recesses forming chambers when two of the plates are pressed together as shown in Fig. 7. With this form of plate, therefore, only two gas chambers are necessary, one on either side of the plate, and consequently the ports or openings leading from the cell to the gas chamber, may be made to extend substantially across the whole of the active surface of the plate, only sufficient metal being left between these parts to prevent the metal from being cut away entirely. In the form of plate illustrated in these two figures, it is obvious that a gas on any one side of the plate will rise directly into an opening leading into the gas chamber, from which it will pass through the passage 25 or 26 into either the duct 14 or the duct 15.

In the form of plate shown in Figs. 6 and 7, the electrolyte may at times rise within the gas chambers. It would then become a pathway for the current, and would also cause the electrolytic action to be carried on in the gas chambers themselves. In order to prevent this, I carry the gasket between the cells up and around the contacting portions of the plate, which form the gas chambers and embed in this gasket a non-porous, non-conducting diaphragm. In the form which I have chosen for purposes of illustration, in Figs. 6 and 7, this diaphragm 32 between the gas chambers only is a thin sheet of metal, such as steel or nickel, which may be coated with porcelain or otherwise insulated on both sides. This diaphragm may also be made up of a pair of plates, suitably insulated from each other.

In Figs. 8 and 9 is shown still another variation of my novel form of electrode plate. In this variation each plate is cast with two complete chambers above it, openings being provided on either side of the recessed active portions of the plate to permit the entry of the gas to the appropriate chamber. In Fig. 9 these plates are shown as separated in the usual manner by gaskets and diaphragms.

In Fig. 10 I have shown a preferred form of combined gasket and diaphragm. The diaphragms are ordinarily of asbestos cloth. It must be of a material which is porous and at the same time resistant to the electrolyte. Heretofore it has been customary to extend this asbestos diaphragm indicated at 33 out to the edges of the plates, and place on either side of the periphery a rubber gasket. But the fact that the diaphragm 33 is necessarily porous causes a leakage due to the electrolyte working through the cloth between the two gaskets and the edge of the diaphragm. By the improvement in which I have shown in Fig. 10, this edge leakage is entirely prevented. Preferably I make my gasket in the form shown at 34 constructing it so that while the rubber is soft, the borders of the diaphragm 33 are embedded therein. The rubber is then vulcanized sufficiently and thereby caused to adhere to the diaphragm 33. It will be understood that the form which I have illustrated is simply my preferred form of combining the diaphragm and gasket, and that the invention may be varied within wide limits. For instance, instead of having the gasket shown in Fig. 10 in one piece, it may be made of three pieces, one extending from the edge of the diaphragm outward and the other to cover either side of the middle gasket as well as the borders of the diaphragm.

It will also be understood that while preferably I form the plates so that the ducts 14, 15 are within the peripheries of the plates, this construction is not necessary to accomplish my novel object. For instance, the ducts may be entirely outside of the plate and above it, or they may be formed by openings in extensions to the plate. Obviously if the ducts 14, 15 were made to communicate with the upper portions of the gas chambers, the barrier 27 would no longer be required.

I claim:—

1. A plurality of electrolytic cells in series, means for keeping separate the different gases formed in each cell, a duct horizontally disposed and below the normal level of the electrolyte in said cells and connected to each of said cells so as to collect and lead away the gas formed on one side only of each cell and means to prevent the electrolyte from entering said duct.

2. An electrolyzer comprising a plurality of flat plates held face to face, said plates being recessed to form a cell between the faces thereof, a diaphragm between each pair of said plates to keep the gas formed on the face of one plate separate from the gas formed on the face of the adjacent plate, a duct connected to each cell and passing through each plate below the normal level of the electrolyte and means to prevent the electrolyte from passing from the cells to said duct.

3. An electrode plate for an electrolyzer of the filter press type, having a central recess in each of its faces, a pair of closed gas chambers above the recessed portions, each communicating with one of said recesses, and the plate having a pair of openings extending therethrough from face to face, one of said openings being connected to one gas chamber and the other opening to the other gas chamber.

4. An electrode plate for an electrolyzer of the filter press type, having a central recess in each of its faces, a pair of gas chambers above the recessed portions, with a wall separating the recesses from the chambers, said wall having a duct therein leading from one of the recesses to one of the chambers, and a duct leading from the other recess to the other chamber, and the plate having a pair of openings extending therethrough from face to face, one of said openings being connected to one gas chamber and the other opening to the other gas chamber.

5. An electrode plate for an electrolyzer of the filter press type, having a central recess in each of its faces, a pair of gas chambers above the recessed portions, with a wall separating the recesses from the chambers, said wall having a set of ducts therein leading from one of the recesses to one of the chambers and a set of ducts leading from the other recess to the other chamber, and the plate having a pair of openings extending therethrough from face to face, one of said openings being connected to one gas chamber and the other opening to the other gas chamber, the mouths of each of said set of ducts extending across substantially the entire side of the recess with which they communicate.

HARRY T. SHRIVER.

Witnesses:
A. E. MARTIN,
C. G. TRUSSELL.